April 19, 1949.  W. P. MARINOS  2,467,841
ELECTRIC VEHICLE DIRECTION INDICATOR
Filed March 19, 1946  2 Sheets-Sheet 1
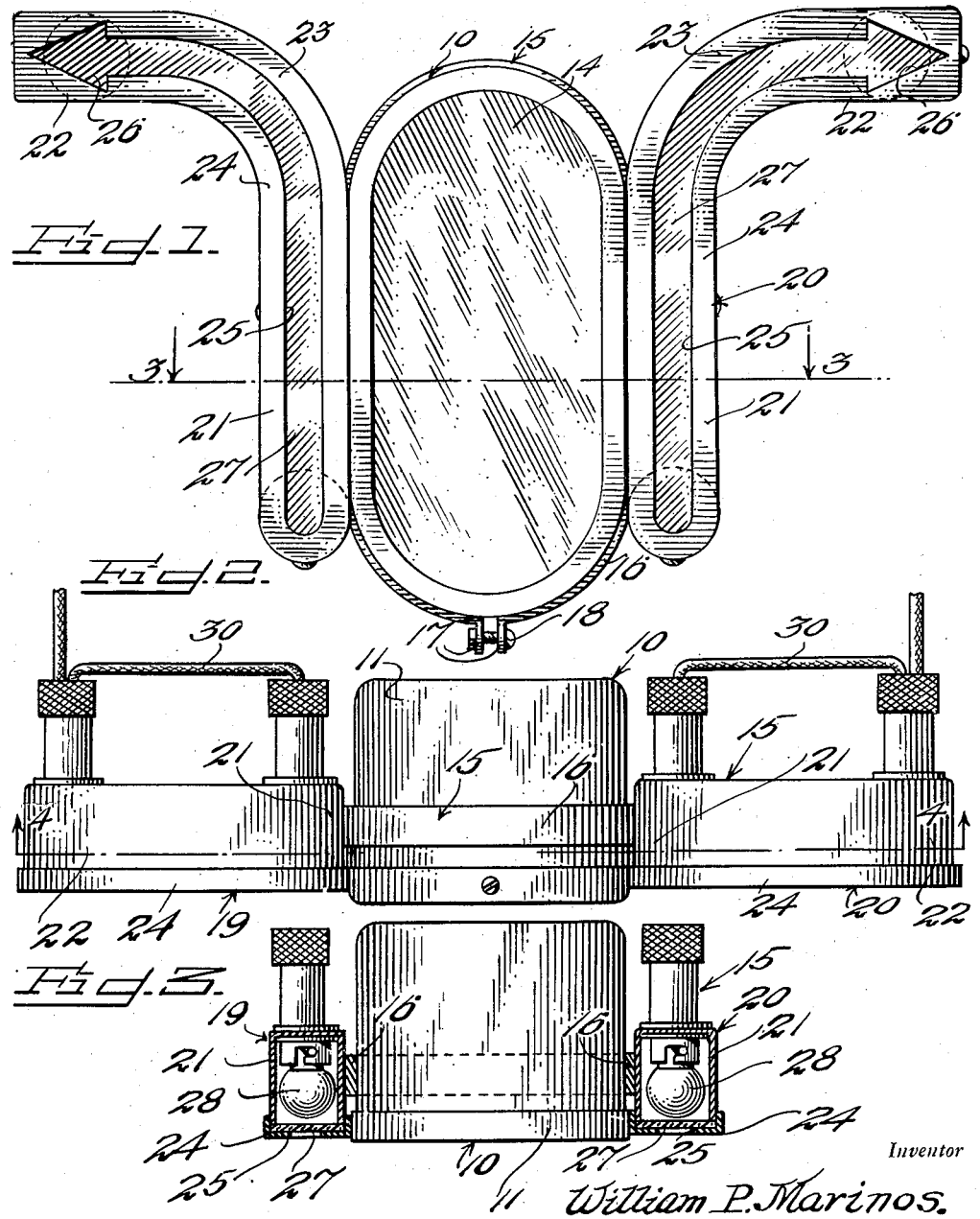
Inventor
William P. Marinos.
By Clarence A. O'Brien
and Harvey B. Jacobson
Attorneys

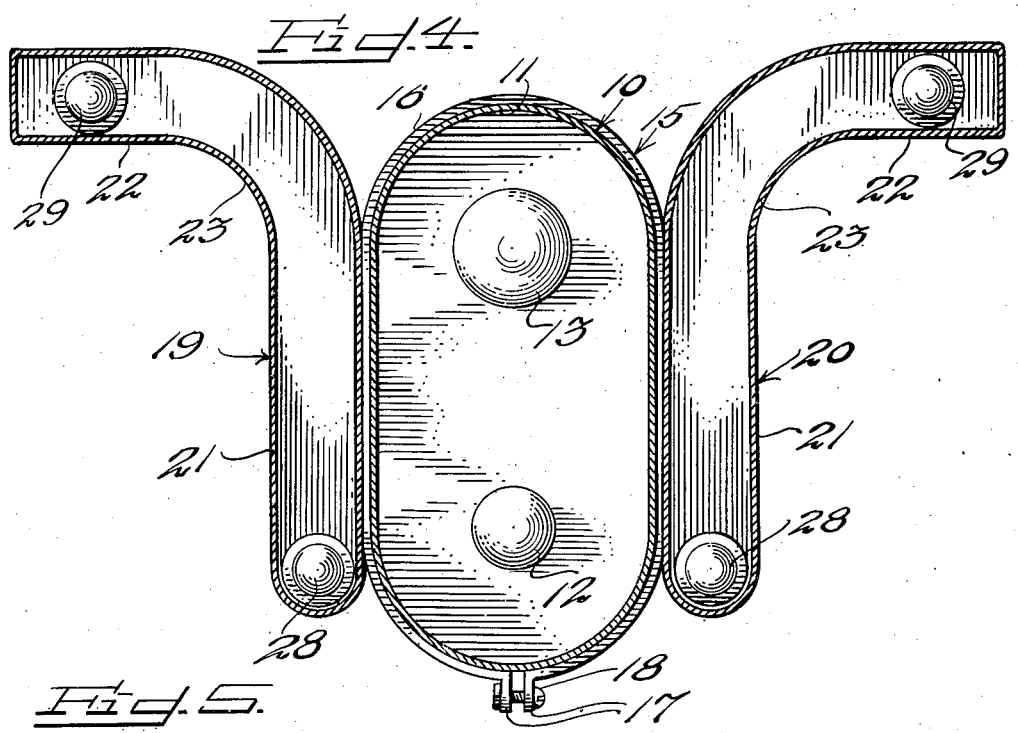

Patented Apr. 19, 1949

2,467,841

UNITED STATES PATENT OFFICE 2,467,841

ELECTRIC VEHICLE DIRECTION INDICATOR

William P. Marinos, Hazel Park, Mich.

Application March 19, 1946, Serial No. 655,501

1 Claim. (Cl. 177—329)

This invention relates to a direction indicator and has for its primary object to warn pedestrians and others of the intention of the driver of a vehicle to make a right or left turn out of a traffic lane.

Another object is to facilitate the application of such a warning signal to the tail light or stop light casing of a motor vehicle.

The above and other objects may be attained by employing this invention which embodies among its features a pair of reflectors bent intermediate their ends to provide perpendicularly projecting legs adapted to be mounted on opposite sides of a tail light or stop light casing, the open sides of the reflectors coinciding with the visible face of the tail light or stop light casing, a cover glass closing the open side of each reflector and being of a color which contrasts with the color of the cover glass of the stop light or tail light, and means controllable by the driver of the vehicle to which the device is attached for illuminating one or the other of the cover glasses according to the direction in which the driver intends to turn.

In the drawings,

Figure 1 is a faced view of a conventional combination stop and tail light showing this improved direction indicator attached thereto, Figure 2 is a top plan view of Figure 1, Figure 3 is a horizontal sectional view taken substantially along the line 3—3 of Figure 1, Figure 4 is a vertical sectional view taken substantially along the line 4—4 of Figure 2, and Figure 5 is a view similar to Figure 1 of a modified form of this invention.

Referring to the drawings in detail, a conventional stop and tail light designated generally 10 comprises an elongated casing 11 in which is housed a conventional tail light bulb 12 and stop light bulb 13. The casing 11 is open on one side and carries thereon a cover glass 14 which not only serves to exclude dust and dirt from the casing, but is usually colored red so that when either the tail light 12 or the stop light 13 is illuminated a red signal will be visible from the rear of the vehicle.

My improved attachment designated generally 15 comprises a band 16 which is adapted to encircle the casing 11 and is provided with outwardly extending pierced ears 17 for the reception of a clamping bolt 18 by which the band is clamped in position about the casing 11. Welded or otherwise attached to opposite sides of the band 16 and extending in spaced parallel relation to one another are reflectors designated generally 19 and 20 each of which comprises a vertical leg 21 terminating at its upper end in a horizontal leg 22, the two legs being joined by a curved portion 23 as will be readily understood upon reference to the drawings. These reflectors 19 and 20 have their open faces coinciding with the side of the casing 11 which is closed by the cover glass 14 and each is provided with a cover plate 24 having a slot 25 which follows the contour of its respective reflector and terminates at its upper and outer end in a V-shaped cut-out portion 26 forming an arrow head. A cover glass 27 is disposed over the open outer face of each reflector 19 and 20 so that a portion of each cover glass is visible through its respective slot 25 and the cut-out 26. The cover glasses 27 are preferably of a color which contrasts to the color of the cover glass 14. Mounted at the lower end of each vertical portion 21 of each reflector is a light bulb 28 and a similar light bulb 29 is mounted directly beneath the cut-out portion 26 of the cover plate 21, and these light bulbs are connected together by suitable conductors housed within cables 30 so that when either of the bulbs is energized the other will likewise be illuminated.

In the modification illustrated in Figure 5 a conventional stop light is designated 31 and comprises a casing 32 having an open side closed by a cover glass 33 which is adapted to be illuminated in the conventional manner. Mounted adjacent the casing 32 is a reflector 34 which as illustrated bends around the casing to form a container for illuminating means 35 which are mounted adjacent opposite ends. The casing 34 is provided with a slot 36 terminating at the end of its horizontal run in an arrow head 37 and mounted beneath the slot 36 is a cover glass 38 which is of a color contrasting with that of the cover glass 33. It is to be understood that with this type of device two stop lights 31 are provided at opposite sides of the rear end of a vehicle with the casings 34 extending in opposite directions as suggested by the dotted lines in Figure 4 so that when one or the other group of lights 35 is illuminated the intention of the driver of the vehicle to which the device is attached will be transmitted to an observer.

In use it will be understood that with my improved attachment 15 connected to a conventional stop and tail light 10 the driver when intending to turn left will energize the lamps 28 and 29 in the reflector 19, thus giving a visual signal to the driver of a vehicle or other observer approaching from the rear. Likewise upon energizing the lamps 28 and 29 in the reflector 20 the intention of the driver to turn right will also be indicated. Due to the fact that the cover glasses 27 are of a color which contrasts with the color of the cover glass 14 it will be evident that when the signal is utilized it will stand out against the colors normally transmitted by the stop and tail light.

From the foregoing it will be obvious that I have provided an attachment which may readily be applied to a combination stop and tail light of conventional form and may be easily and quickly connected to the power circuit of a conventional motor vehicle.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

The combination with a lamp housing which includes an elongated casing having spaced parallel sides and an elongated window opening between its sides, an elongated cover glass closing said window opening and illuminating means within the casing, of a direction indicator adapted to be clamped about the lamp housing comprising a band adapted to encircle the lamp housing, said band conforming to the shape of the lamp housing and having spaced parallel side portions extending between curved end portions, an elongated reflector fixed to each side portion of the band, a reflector arm extending outwardly away from the band at one end of each reflector, the open sides of the reflectors and of the arms coinciding with the window in the lamp housing, a cover glass contrasting in color with the first mentioned cover glass closing the open side of each reflector and the arm thereof and illuminating means at each end of each reflector.

WILLIAM P. MARINOS.

REFERENCES CITED

The following references are of record in the file of this patent:

UNITED STATES PATENTS

| Number | Name | Date |
|---|---|---|
| D. 80,345 | Weiss | Jan. 14, 1930 |
| 1,498,530 | Rule | June 24, 1924 |
| 1,530,234 | Chapman | Mar. 17, 1925 |
| 2,120,288 | McCready | June 14, 1938 |